Oct. 9, 1962 B. W. QUAIL Re. 25,251

SEAL FOR RECIPROCATING VALVE

Original Filed April 2, 1957

INVENTOR
Bernard W. Quail
BY
Gerald Dunstewitz
AGENT

United States Patent Office

Re. 25,251
Reissued Oct. 9, 1962

25,251

SEAL FOR RECIPROCATING VALVE

Bernard W. Quail, Scotch Plains, N.J., assignor to Specialties Development Corporation, Belleville, N.J., a corporation of New Jersey Original No. 2,938,704, dated May 31, 1960, Ser. No. 650,179, Apr. 2, 1957. Application for reissue Apr. 18, 1962, Ser. No. 189,252
7 Claims. (Cl. 251—172)

Matter enclosed in heavy brackets [ ] appears in the original patent but forms no part of this reissue specification; matter printed in italics indicates the additions made by reissue.

The present invention relates to valve seals, and, more particularly, to seals for reciprocating valves of the cooperating seal and head type for controlling the flow of fluids.

In many specialized applications, it is necessary to provide seals which will be both leakproof and durable over a wide range of temperatures, for example, between minus 65° F. and plus 165° F. Materials, such as silicone rubber, remain resilient over the required temperature range and therefore provide a tight seal throughout the range, but are structurally weak and break down when in contact with a moving valve element, especially at the higher temperatures. Materials, such as Teflon, have good structural strength and are not adversely affected by high temperatures, but lack the necessary resilience to provide an effective seal and are also subject to cold flow, whereby a moving valve element tends to draw such material out of the seating groove.

Accordingly, an object of the present invention is to provide a valve seal which is effective and indestructible through a greater temperature range than that of presently known valve seals.

Another object is to provide a resilient valve seal wherein a durable material is in contact with a moving valve member.

A further object is to provide a valve seal wherein a durable material which is normally subject to cold flow is used in such a manner so as to prevent it from being drawn out of its seal.

A still further object is to provide an improved valve seat for valves wherein pressure acting on the head is balanced.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a valve seal for a valve including a body having a chamber and a valve member in the chamber having a generally cylindrical portion with which the seal cooperates, which seal comprises an annular formation in the body including an annular radially inwardly extending shoulder provided with an upwardly extending wall at its outer end and with a shorter upwardly extending wall at its inner end and having an annular recess above the outer end wall; a retaining ring having a flange portion seated in the recess at its outer periphery and having a downwardly extending wall at its inner end terminating short of the inner end wall and being substantially concentric therewith to provide an annular slot between the opposed ends of the inner end walls and to provide an annular cavity defined by the shoulder, the flange and the inner and outer end walls, the inner face of the inner end walls being dimensioned to provide a close fit with the cylindrical valve member portion; a sealing ring positioned in the cavity and seated on the shoulder including a wall facing said inner walls and having a projection thereon extending radially inwardly through the slot; and a packing ring positioned in the cavity, the projection being positioned for engagement by the cylindrical valve member portion to cause the sealing ring to effect compression of the packing ring. Preferably, venting means are provided to allow fluid pressure to act on the packing ring to thereby pressurize the sealing ring, and a washer is positioned in the cavity between the sealing ring and the retaining ring.

A preferred embodiment of the invention has been chosen for purposes of illustration and description, and is shown in the accompanying drawing, forming a part of the specification, wherein.

Figure 1:
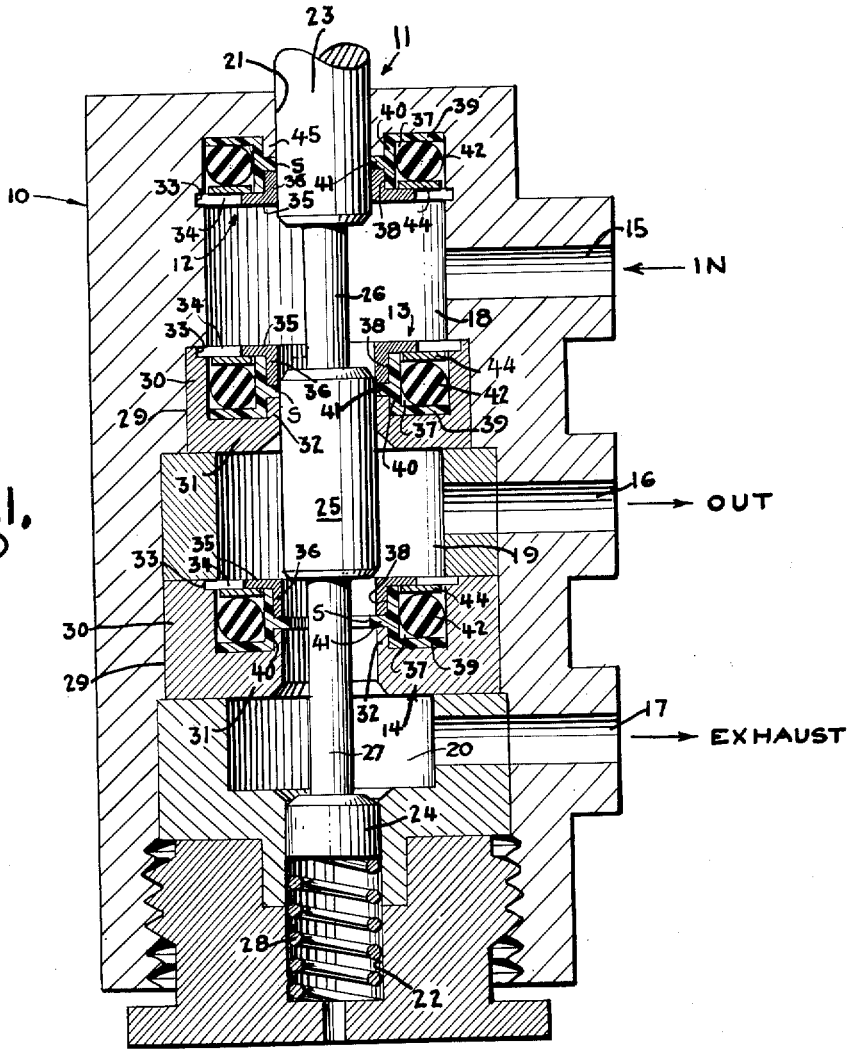
FIG. 1 is a longitudinal sectional view of a valve embodying the seal in accordance with the present invention.

Referring to the drawing in detail and more particularly to FIG. 1 thereof, there is shown a valve in which several seals illustrative of the present invention are embodied. The valve generally comprises a valve body 10, a reciprocating valve member 11, and three seals 12, 13 and 14 in accordance with the invention which are arranged in the manner described hereinafter.

The valve body 10 is provided with an inlet port 15, an outlet port 16 and an exhaust port 17 in one side wall thereof, a central bore including an inlet chamber 18, an outlet chamber 19 and an exhaust chamber 20 in communication with the ports 15, 16 and 17 respectively, an opening 21 in one end wall thereof, and a vented well 22 in the other end wall thereof.

The valve member 11 includes a cylindrical portion 23 at one end thereof, a cylindrical portion 24 at the other end thereof, and an intermediate cylindrical head portion 25 connected to the end portions 23 and 24 by rod-like sections 26 and 27, respectively. The valve member 11 is positioned in the valve body 10 so that the cylindrical end portion 23 passes through the valve body opening 21, and the cylindrical end portion 24 extends into the vented well 22 wherein a spring 28 is provided to urge the valve member upwardly.

The seals 12, 13 and 14, about to be described, cooperate with the valve member portions 23 and 25 to insure leakproof operation of the valve. The seal 12 is positioned adjacent the valve body opening 21 to cooperate with the valve member end portion 23 and provide a running seal which prevents fluid leakage about the end portion 23. The seals 13 and 14 operate as valve seats and are positioned within the valve body between the chambers 18 and 19 and the chambers 19 and 20, respectively, to cooperate with the valve member intermediate portion 25 and thereby control the flow of fluid between the ports 15, 16 and 17. In this manner, the seal 13 is positioned between the inlet port 15 and the outlet port 16 to separate the inlet chamber 18 from the outlet chamber 19, and the seal 14 is positioned between the outlet port 16 and the exhaust port 17 to separate the outlet chamber 19 from the exhaust chamber 20.

The seals 13 and 14 are identical, and each has an annular formation 29 which includes an outer wall section 30 formed with a recess 33 at its upper end and a shoulder section 31 provided with an inner cylindrical wall portion 32. A retaining ring 35 has a flange 34 also provided with an inner cylindrical wall portion 36 which extends towards the shoulder inner wall 32 and terminates short of this wall to define a slot S therebetween. These cylindrical walls are dimensioned at their inner face to provide a tight fit with the cylindrical valve head portion 25. The annular formation 29 and the retaining ring 35 define an annular cavity 37 in which a sealing ring 38 is seated. This sealing ring comprises a flange portion 39 seated on the shoulder 31, a cylindrical wall portion 40 seated against the inner wall portions 32 and 36 of the shoulder 31 and the retaining ring 35, respectively, and a projection or bead 41 which extends through the slot S and has an inner face for engagement by the valve member cylindrical head portion 25.

Figure 2:
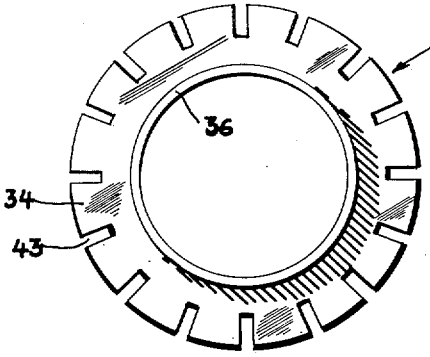
FIG. 2 is a plan view illustrating the retaining ring in detail.

A packing ring 42 is positioned in the cavity 37 above the sealing ring flange 39 and between the wall 30 and the sealing ring cylindrical wall 40. The retaining ring 35 is provided with slots 43 (FIG. 2) to allow fluid pressure to act on the packing ring to force the sealing ring into close contact with the valve member 25. For high pressure pneumatic operation, preferably a washer 44 is positioned between the packing ring 42 and the flange 34 of the retaining ring 35 to prevent the catastrophic destruction of the packing ring when the pressure on the packing ring is suddenly removed.

The seal 12 is similar in construction and operation to the seals 13 and 14, except that the annular formation 29 in the seals 13 and 14 is not provided as a separate piece but is formed in the valve body 10 as a cylindrical wall portion 45 surrounding the opening 21 to provide one piece construction. The cylindrical wall portion 45 of the seal 12 is the equivalent of the inner cylindrical wall 32 of the seals 13 and 14.

In operation, when the valve member 11 is in the position shown in FIG. 1, fluid under pressure enters chamber 18 through the inlet port 15 and acts on the seals 12 and 13 by passing through the slots 44 in the retaining rings 35 into the annular cavities 37 to pressurize the packing rings 42 and thereby force the sealing rings 38 inwardly. The flange portions 39 of the sealing rings act as seals against fluid leakage around the cylindrical wall portions 40 of the sealing rings. These pressurizing forces are concentrated on the narrow projections 41 of the sealing rings 38 to force the same into close contact with the valve member portions 23 and 25, respectively, thus forming tight seals.

To operate the valve, the valve member 11 is moved downwardly by suitable mechanism (not shown) against the force of the spring 28 until the valve head member 25 disengages the seal 13 and engages the seal 14 to force its sealing ring 38 outwardly against its packing ring 42. The inlet chamber 18 is then in communication with the outlet chamber 19 and the outlet chamber 19 is sealed off from the exhaust 20. The pressures acting on the members of seal 13 are now equalized and the pressurized fluid acts on the seal 14 in the above described manner to provide a tight seal.

When the valve member 11 is returned to its normal position, the chamber 19 is again in communication with the chamber 20 and the pressure in the chamber 19 is suddenly exhausted. Under high pressure pneumatic operation, packing rings of porous materials become more or less saturated with entrained gases. With such rapid pressure drop these entrained gases expand rapidly and cause the catastrophic destruction of the packing ring. The washers 44, provided for high pressure operation to retain the packing ring, retard the outward flow of the entrained pneumatic fluid following a sudden pressure drop.

In order for a valve seal to operate efficiently through a wide temperature range and under high pressures, it is necessary that the material of which the seal is made be durable, for contact with the valve member, and exhibit resiliency throughout the entire temperature range. This is accomplished by utilizing a sealing ring 38 of Teflon or similar durable material and a packing ring 42 of a resilient material such as silicone rubber. The stiffness of materials such as Teflon is overcome by using a relatively thin sealing ring 38 through which the resiliency of the packing ring 42 can be transmitted to the valve member contacting surface of the sealing ring projection 41. The disadvantage of the cold flow property of Teflon is overcome by the restraining action of the inner walls 45 or 32 and 36 of the shoulder and the retaining ring which prevent the sealing ring from being drawn out of its seat by the movement of the valve portions 23 and 25. These walls also prevent the sealing ring from being blown out of its seat by the pressure differential which exists between the inner and outer surfaces of the sealing ring of the seal 14 when the valve head 25, while moving upwardly to establish communication between the chambers 19 and 20, disengages the sealing ring projection 41 but is still in contact with the cylindrical wall portion 36 just prior to establishing such communication.

It will be noted that the use of the seal 13 as a valve seat enables the piston areas of the valve portions 23 and 25 to be identical, therefore, the pressurized fluid in the chamber 18 will exert the same axial force against each of these piston surfaces, balancing them and causing no motion of the valve member 11.

It has been found that at cold temperatures both the sealing ring and the packing ring will tend to shrink in diameter thus forcing the sealing ring into closer contact with the valve member. At high temperatures, although the sealing ring and the packing ring tend to expand in diameter, the packing ring also expands cross-sectionally. Since the packing ring is completely confined, it expands against the sealing ring to force it again into close contact with the valve member.

Extensive tests have determined that by using materials of the type specified this valve will remain leakproof under pneumatic pressure as high as 3000 p.s.i.g. through a range of temperatures from minus 100° F. to plus 350° F. Such tests included operating a valve through 5000 cycles between zero and 3000 p.s.i.g. at 300° F.

From the foregoing description, it will be seen that the present invention provides an improved valve seal which can be used as either a running seal or a valve seat in connection with reciprocating type valves to provide effective sealing at high pressures over a wide temperature range while retaining the durability of conventional seals operating at normal temperatures and pressures. The seal when used as a valve seat also enables the precise balancing of the valve member to prevent motion of the valve member upon application of pressure.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A seal for use between relatively reciprocating concentric members to prevent leakage of fluid, said seal comprising an annular formation in the outer member including an annular radially inwardly extending shoulder provided with an upwardly extending cylindrical wall at its outer end and with a shorter upwardly extending cylindrical wall at its inner end and having an annular recess above said outer end wall, a retaining ring having a flange portion seated in said recess at its outer periphery and having a downwardly extending cylindrical wall at its inner end terminating short of inner end wall and being substantially concentric therewith to provide an annular slot between the opposed ends of said inner end walls and to provide an annular cavity defined by said shoulder, said flange and said inner end walls, the inner face of said inner end walls being dimensioned to provide a close fit with the inner member, a sealing ring positioned in said cavity including a flange seated on said shoulder, a cylindrical wall at the inner end of said last mentioned flange, and a projection on said last mentioned cylindrical wall extending radially inwardly through said slot, and a packing ring positioned in said cavity above said sealing ring flange, said projection being positioned for engagement by the inner member to cause said sealing ring to effect compression of said packing ring and said flange portion of said retaining ring being provided with apertures to allow fluid pressure to act on said packing ring to pressurize said sealing ring.

2. A seal according to claim 1, wherein a washer is positioned in said cavity between said packing ring and said flange portion of said retaining ring.

3. A seal for use between relatively reciprocating concentric members to prevent leakage of fluid, said seal comprising an annular formation in the outer member including an annular radially inwardly extending shoulder provided with upwardly extending cylindrical wall at its inner end, an annular retaining formation in said body above said shoulder and including an annular radially inwardly extending flange portion and a downwardly extending cylindrical wall at the inner end of said flange portion terminating short of said inner end wall of said shoulder and being substantially concentric therewith to provide an annular slot between the opposed ends of said inner end walls and to provide an annular cavity defined by said shoulder, said flange and said inner end walls, the inner face of said inner walls being dimensioned to provide a close fit with the inner member, a sealing ring positioned in said cavity including a substantially cylindrical wall portion and a projection on said cylindrical wall portion extending radially inwardly through said slot, an annular resilient member positioned in said cavity outwardly of said sealing ring, said projection being positioned for engagement by the inner member to cause said sealing ring to effect compression of said annular resilient member, and passageway means adjacent said cavity and said chamber to allow fluid pressure to act on said resilient member to pressurize said sealing ring.

4. A seal for sealing off a pressurized volume comprising a hollow annular formation having a vertical inner wall, a vertical outer wall, a horizontal upper wall and a horizontal lower wall defining an annular chamber therein, one of said vertical walls having a cylindrical outer surface and having an annular slot therethrough, and said upper wall being adapted to have its outer surface in communication with the pressurized volume to be sealed off and having a passageway therein providing communication between said chamber and said outer surface of said upper wall; an annular seating ring positioned in said chamber adjacent said slotted vertical wall, said sealing ring being of greater height than said slot and having an annular projection thereon extending radially through said slot; and a packing ring positioned in said chamber adjacent the side of said sealing ring opposite said projection to be pressurized through said passageway by the pressure in the pressurized volume and force said sealing ring toward said slotted vertical wall.

5. A seal for sealing off a pressurized volume comprising a hollow annular formation having an inner wall, an outer wall, an upper wall and a lower wall defining an annular chamber therein, said inner wall having a cylindrical outer surface and having an annular slot therethrough, and said upper wall being adapted to have its outer surface in communication with the pressurized volume to be sealed off and having a passageway therein providing communication between said chamber and said outer surface of said upper wall; an annular sealing ring positioned in said chamber adjacent said inner wall, said sealing ring being of greater height than said slot and having an annular projection thereof extending radially through said slot; and a packing ring positioned in said chamber radially outwardly of said sealing ring to be pressurized through said passageway by the pressure in the pressurized volume and force said sealing ring inwardly.

*6. A seal for sealing off a pressurized volume comprising structure providing a hollow annular formation having first, second, third and fourth annular walls, said walls being arranged to define an annular chamber of rectangular cross-section, said first wall having an outer sealing surface and having an annular opening therethrough; an annular sealing ring positioned in said chamber adjacent said first wall, said sealing ring being of greater width than said annular opening and having an annular projection thereon extending through said annular opening; and a packing ring positioned in said chamber adjacent the side of said sealing ring opposite said projection, said chamber being positioned for communication with the pressurized volume to be sealed off and having a passageway in one of said walls other than said first wall providing communication between the portion of said chamber in back of said packing ring and the pressurized volume whereby said packing ring is pressurized through said passageway by the pressure in the pressurized volume and forces said sealing ring towards said first wall.*

*7. A seal according to claim 6, wherein a washer is positioned in said chamber between said packing ring and the wall formed with said passageway.*

References Cited in the file of this patent or the original patent

| | | |
|---|---|---|
| Re. 24,440 | Groen | Mar. 4, 1958 |
| 2,348,548 | Koehler | May 9, 1944 |
| 2,494,598 | Waring | Jan. 17, 1950 |
| 2,645,450 | Chessman | July 14, 1953 |
| 2,701,155 | Estel | Feb. 1, 1955 |
| 2,747,611 | Hewitt | May 29, 1956 |
| 2,800,376 | Traupmann et al. | July 23, 1957 |

FOREIGN PATENTS

| | | |
|---|---|---|
| 734,691 | Great Britain | Aug. 3, 1955 |
| 753,854 | Great Britain | Aug. 1, 1956 |